United States Patent
Seki et al.

(10) Patent No.: US 10,900,524 B2
(45) Date of Patent: Jan. 26, 2021

(54) SEALING MEMBER, AND BEARING DEVICE FOR VEHICLE WHEEL COMPRISING SAME

(71) Applicant: NTN CORPORATION, Osaka (JP)

(72) Inventors: Makoto Seki, Iwata (JP); Hisanori Kobayashi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/647,271

(22) PCT Filed: Sep. 14, 2018

(86) PCT No.: PCT/JP2018/034152
§ 371 (c)(1),
(2) Date: Mar. 13, 2020

(87) PCT Pub. No.: WO2019/054473
PCT Pub. Date: Mar. 21, 2019

(65) Prior Publication Data
US 2020/0277993 A1 Sep. 3, 2020

(30) Foreign Application Priority Data
Sep. 15, 2017 (JP) .................................. 2017-178366

(51) Int. Cl.
*F16C 33/76* (2006.01)
*F16C 33/80* (2006.01)
(Continued)

(52) U.S. Cl.
CPC .......... *F16C 33/7823* (2013.01); *F16C 19/18* (2013.01)

(58) Field of Classification Search
CPC .. F16C 19/186; F16C 19/386; F16C 33/7883; F16C 2326/02; B60B 27/0073
See application file for complete search history.

(56) References Cited

U.S. PATENT DOCUMENTS 6,003,871 A 12/1999 Poll
8,016,294 B2 * 9/2011 Shibayama ......... B60B 27/0005
277/551
(Continued)

FOREIGN PATENT DOCUMENTS

JP 9-144767 6/1997
JP 2001-510271 7/2001
(Continued)

OTHER PUBLICATIONS

International Search Report, dated Dec. 11, 2018 in corresponding International Patent Application No. PCT/JP2018/034152.

*Primary Examiner* — Phillip A Johnson
(74) *Attorney, Agent, or Firm* — Wenderoth, Lind & Ponack, L.L.P.

(57) ABSTRACT

A sealing member of a bearing device for vehicle wheel including: a sealing plate having a sealing plate fitting section (7a) fitted to an inner circumferential surface of an outer ring, an annular support section (7c) extending radially inwardly from the sealing plate fitting section, and sealing lips provided on one side surface of the support section; and a slinger (8) having a slinger fitting section (8a) fitted to the outer circumferential surface of an inner ring (4) and an annular upright plate section (8b) extending radially outwardly from the slinger fitting section and facing the support section. The plurality of sealing lips are in contact with one side surface of the upright plate section or with the slinger fitting section, the support section is bent to form an annular groove section, and the outer peripheral portion of the upright plate section is bent to form a cylindrical wall section.

9 Claims, 9 Drawing Sheets

(51) Int. Cl.
*F16C 33/78* (2006.01)
*F16C 19/18* (2006.01)

(56) References Cited

U.S. PATENT DOCUMENTS

| | | |
|---|---|---|
| 8,342,535 B2 | 1/2013 | Lattime et al. |
| 8,991,829 B2 | 3/2015 | Lattime et al. |
| 9,291,272 B2 | 3/2016 | Lattime et al. |
| 10,344,803 B2 | 7/2019 | Ohmori |
| 2006/0076737 A1* | 4/2006 | Kobayashi ............ F16J 15/326 277/317 |
| 2009/0127795 A1 | 5/2009 | Lattime et al. |
| 2009/0127796 A1 | 5/2009 | Kanzaki et al. |
| 2014/0159318 A1 | 6/2014 | Lattime et al. |
| 2015/0159761 A1 | 6/2015 | Lattime et al. |
| 2018/0087575 A1 | 3/2018 | Ohmori |

FOREIGN PATENT DOCUMENTS

| | | | |
|---|---|---|---|
| JP | 2006-83981 | 3/2006 | |
| JP | 2006-342827 | 12/2006 | |
| JP | 2009-197884 | 9/2009 | |
| JP | 2010091036 A * | 4/2010 | ............ F16C 33/805 |
| JP | 2010-185465 | 8/2010 | |
| JP | 2011-503493 | 1/2011 | |
| JP | 2016-61392 | 4/2016 | |
| JP | 2016-211595 | 12/2016 | |
| WO | WO-2015064400 A1 * | 5/2015 | ............ F16C 33/805 |
| WO | WO-2017038751 A1 * | 3/2017 | ............ F16J 15/3232 |

* cited by examiner

[Fig.1]
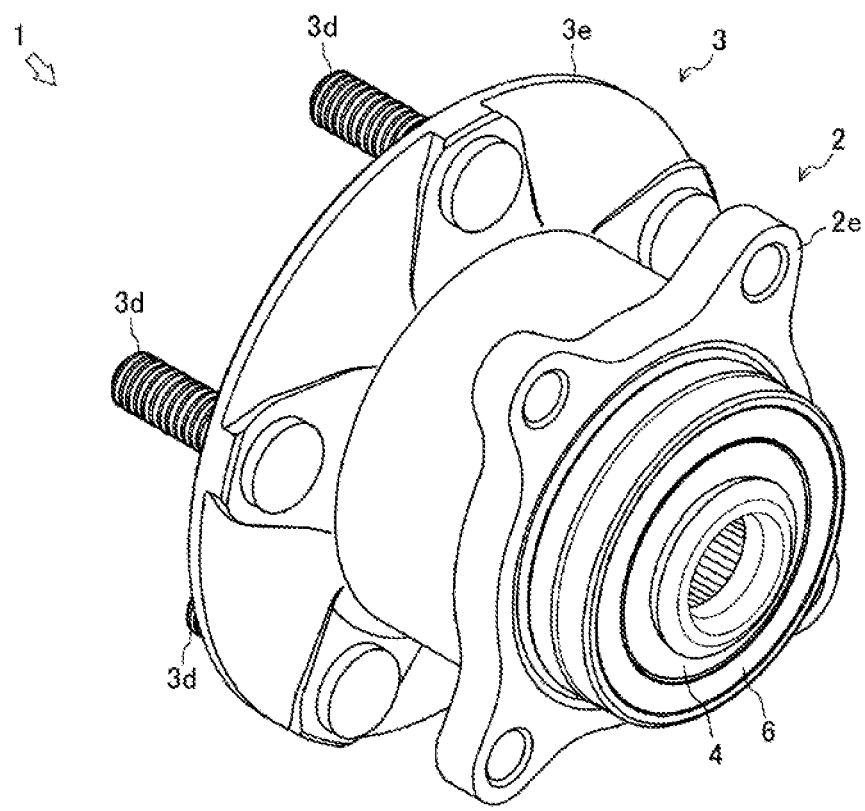

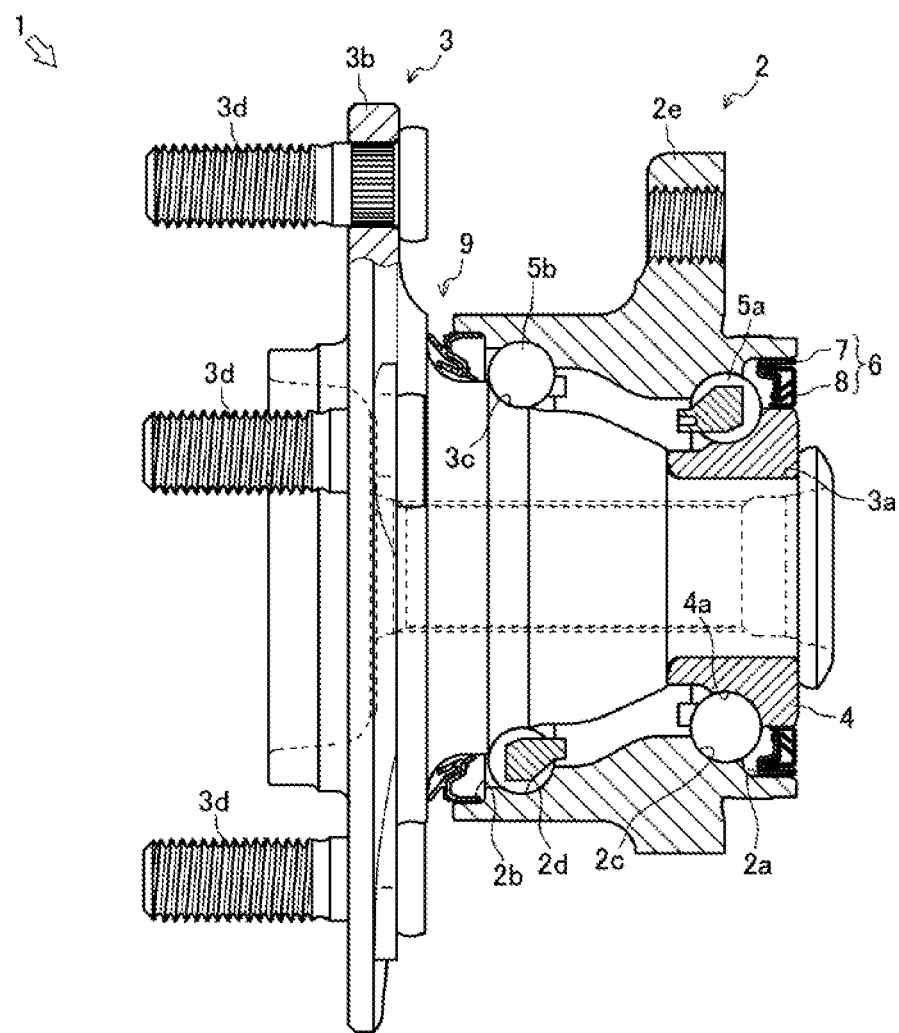
[Fig.2]

[Fig.3]
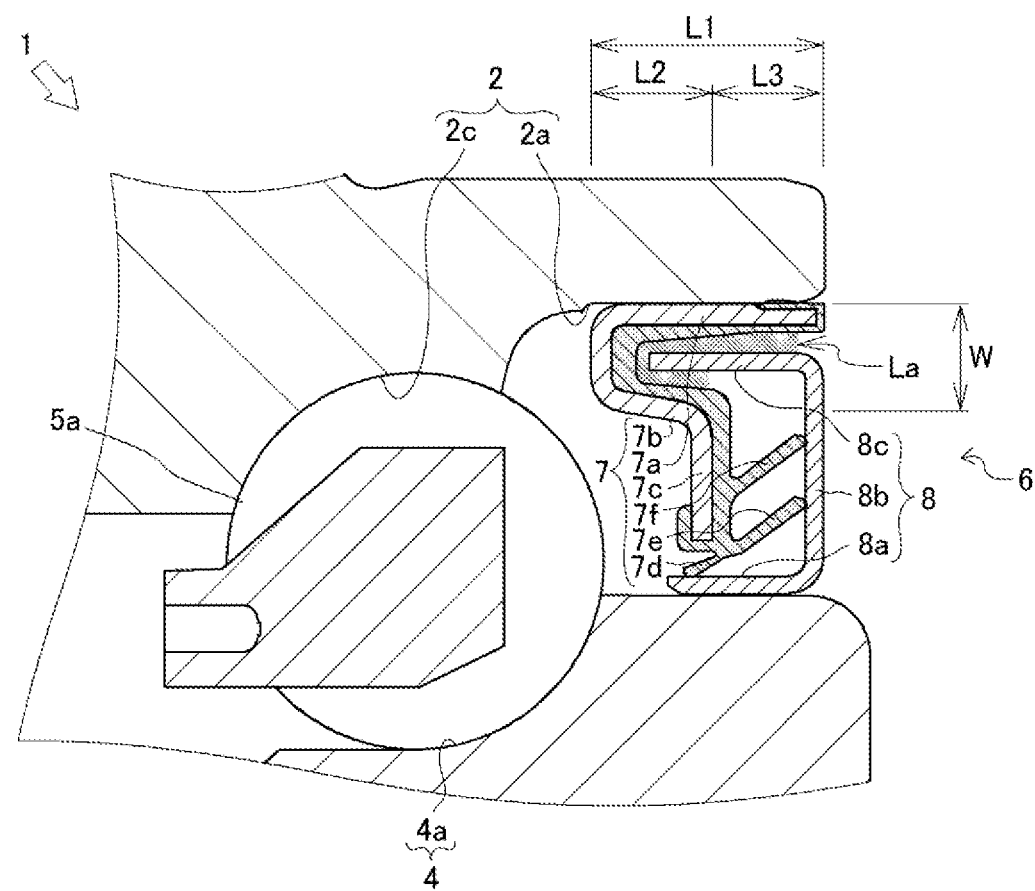

[Fig.4]
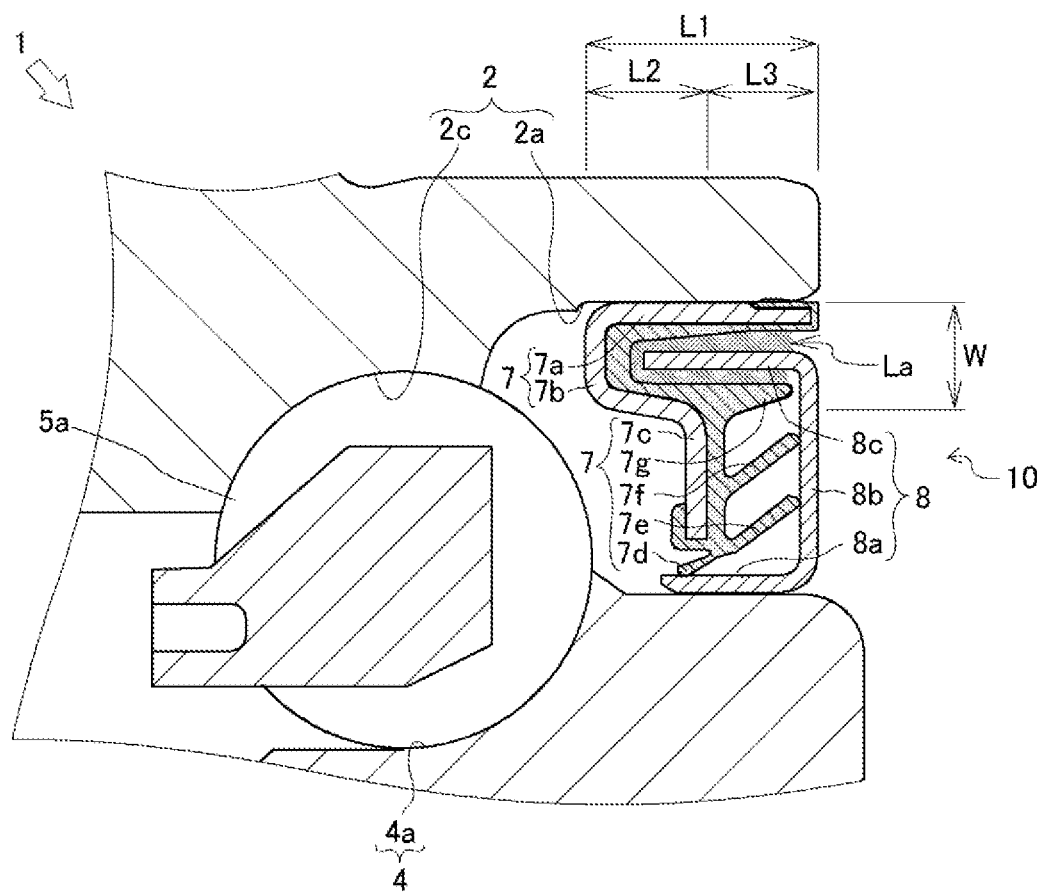

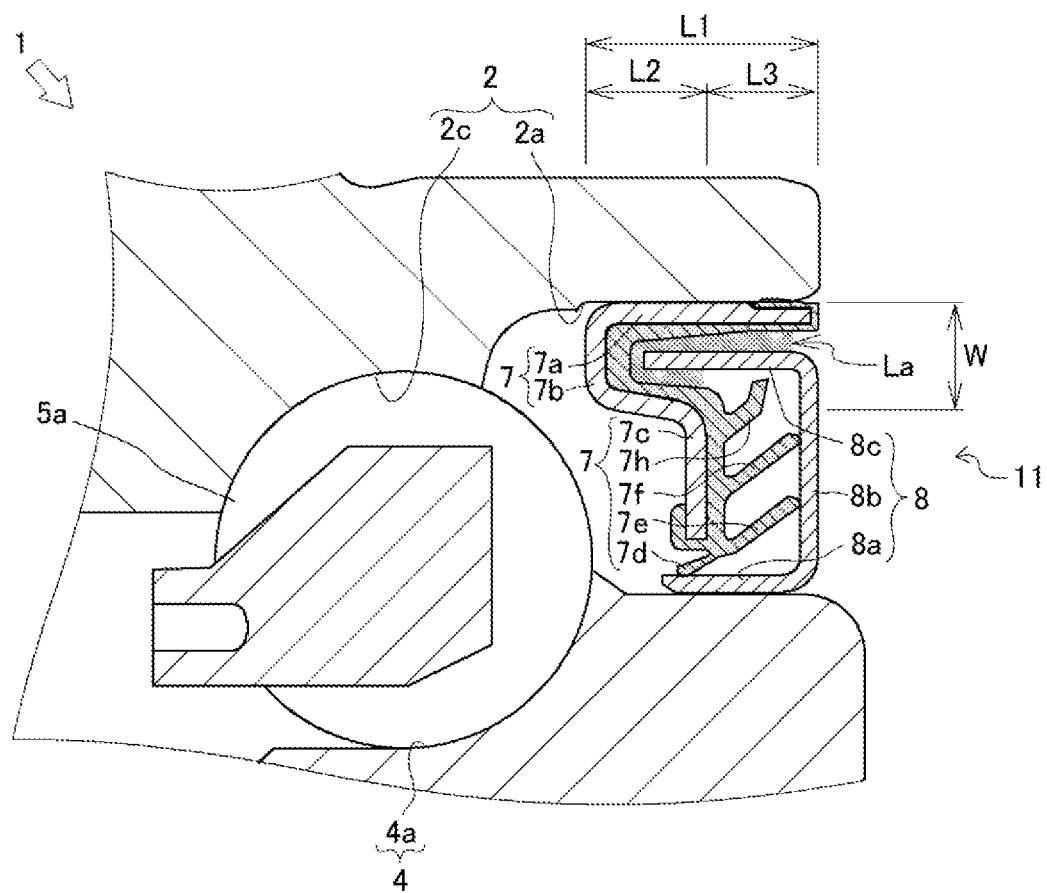
[Fig.5]

[Fig.6]
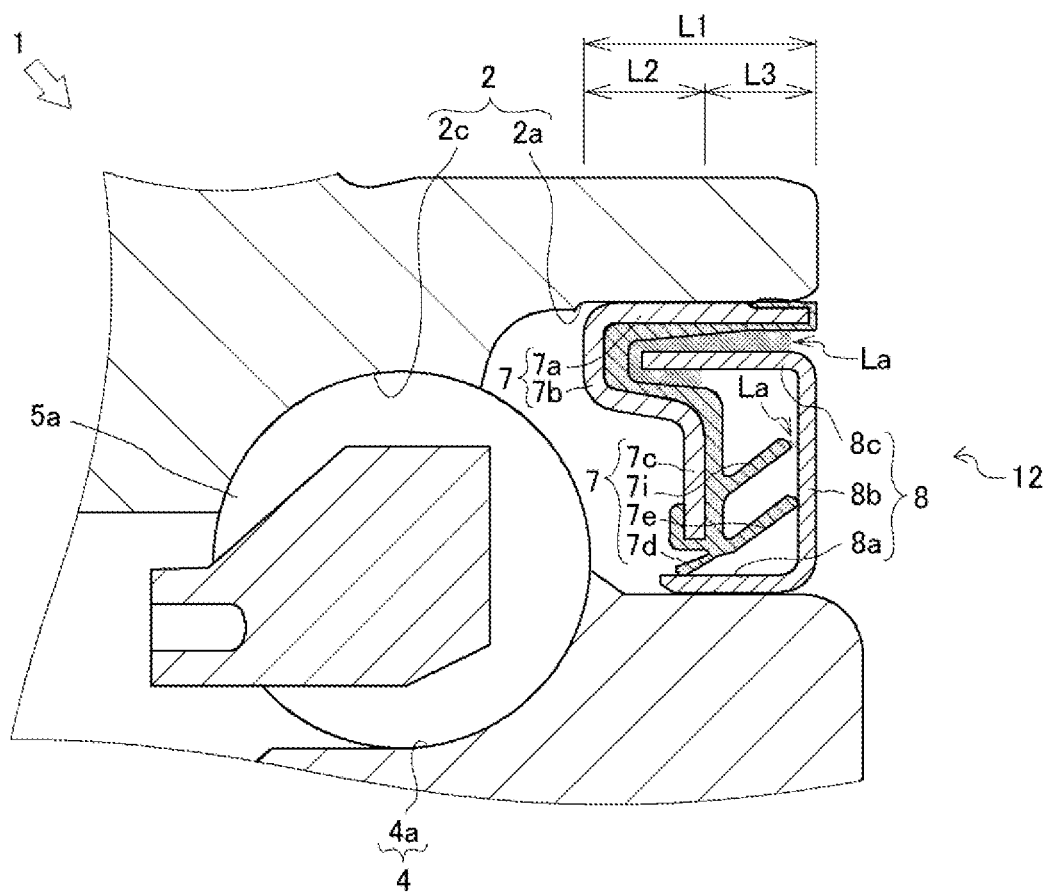

[Fig.7]
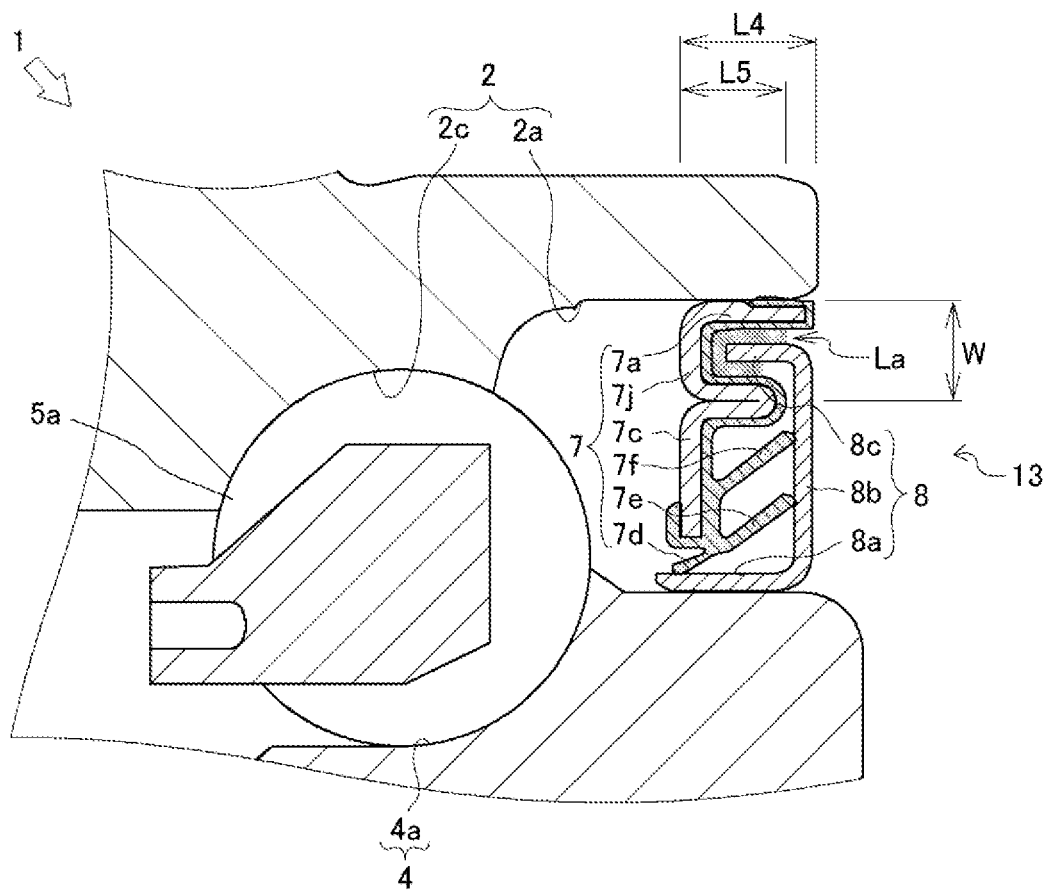

[Fig.8]
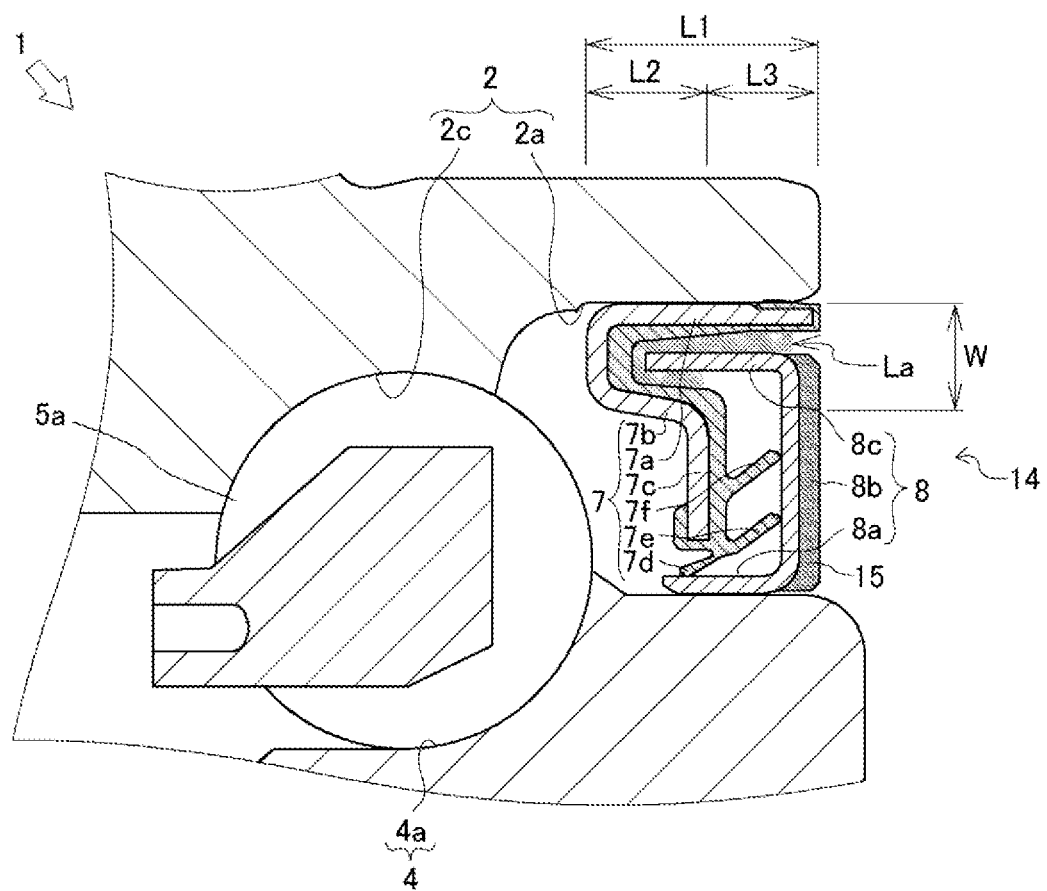

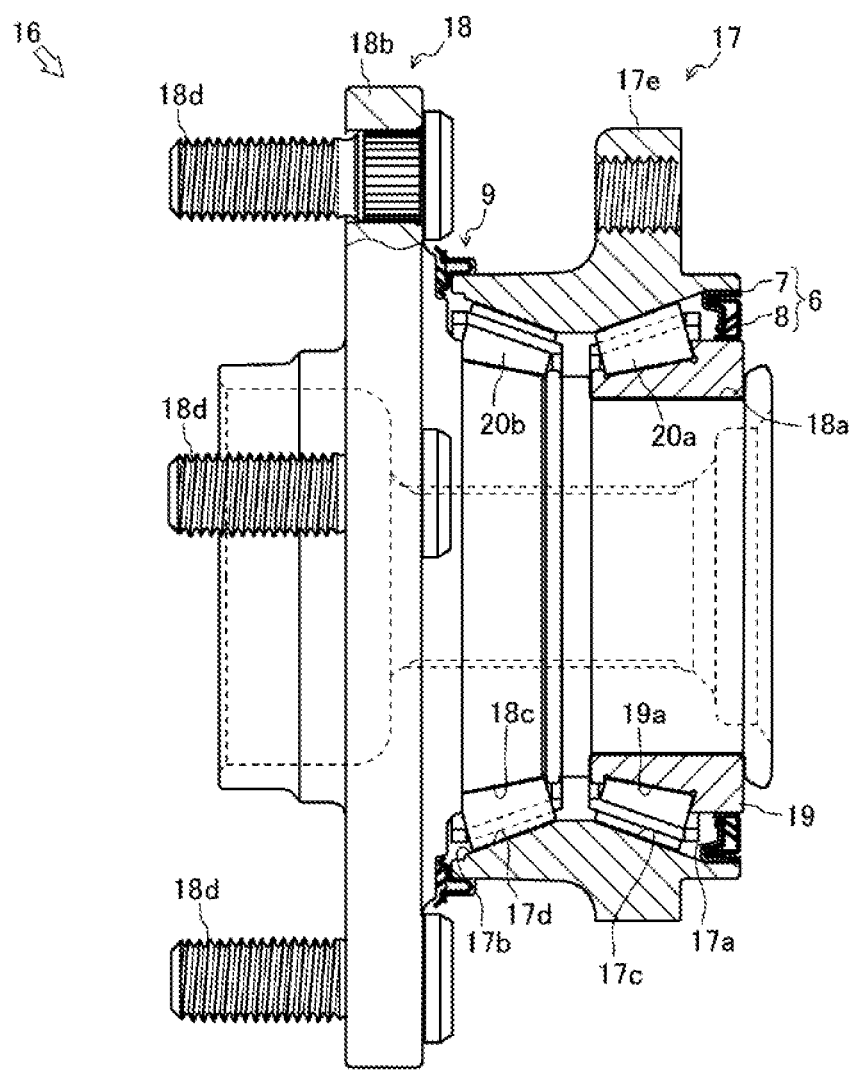
[Fig.9]

SEALING MEMBER, AND BEARING DEVICE FOR VEHICLE WHEEL COMPRISING SAME

TECHNICAL FIELD

The present invention relates to a sealing member and a bearing device for vehicle wheel including the sealing member.

BACKGROUND ART

Conventionally, there has been known a bearing device for vehicle wheel that rotatably supports a wheel in a suspension device of an automobile or the like. In the bearing device for vehicle wheel, an outer member is fixed to a knuckle provided on a vehicle chassis or the like, and an inner member including a hub ring is rotatably supported via a rotating body. The bearing device for vehicle wheel is provided with a sealing member that closes a gap between the outer member and the inner member. A sealing plate fitted to the outer member of the bearing device for vehicle wheel and a slinger fitted to the inner member to cover the sealing plate are combined to configure an inner side (side close to a vehicle) sealing member as a pack seal. The inner side sealing member has a plurality of sealing lips provided on the sealing plate in contact with the slinger, thereby preventing leakage of internal grease and preventing entry of rainwater, muddy water, dust, and the like from outside.

In such a bearing device for vehicle wheel, in order to obtain a long bearing life even in a severe use environment exposed to dust, muddy water, and the like, some sealing members are provided with a plurality of sealing mechanisms to improve sealing performance. For example, a labyrinth is configured to suppress dust and muddy water from entering inside of the pack seal. With this configuration, in the pack seal, the labyrinth suppresses rainwater and dust from entering a tip of the sealing lip, prevents damage to the tip of the sealing lip, and thus improves the sealing performance. This is described, for example, in Patent Literature 1.

A sealing member described in Patent Literature 1 has a cylindrical portion extending from an outer peripheral portion of a slinger toward a sealing plate. In the sealing member, a labyrinth seal is configured by a slight radial gap between an outer peripheral surface of the cylindrical portion and the sealing plate. The sealing member is further provided with an auxiliary lip on the sealing plate, the auxiliary lip being in contact with an inner peripheral surface of the cylindrical portion. Accordingly, the sealing member suppresses muddy water and dust from entering from outside by the labyrinth seal, and also shuts off the muddy water, dust, and the like entering inside by the auxiliary lip to prevent damage to and wear of a tip of a sealing lip.

CITATIONS LIST

Patent Literature

Patent Literature 1: JP-A 2009-197884 Gazette

SUMMARY OF INVENTION

Technical Problems

The sealing member is provided with an auxiliary lip that is in contact with the cylindrical portion of the slinger, in addition to an axial lip that is in contact with a standing plate portion of the slinger, an intermediate lip and a radial lip that are in contact with a fitting portion of the slinger. As described above, the bearing device for vehicle wheel is configured to improve the sealing performance by a plurality of lips to prevent muddy water, dust, and the like that have passed through the labyrinth from entering inside of the bearing device. However, rotational torque of the sealing member increases due to sliding resistance as the number of sealing lips in contact with the slinger increases. For this reason, although the technique described in Patent Literature 1 prevents muddy water, dust, and the like from entering, the rotational torque increases due to contact between the auxiliary lip and the slinger.

The present invention has been made in view of the above circumstances. It is an object of the present invention to provide a sealing member that can improve sealing performance without increasing rotational torque, and a bearing device for vehicle wheel including the sealing member.

Solutions to Problems

A bearing device for vehicle wheel includes an outer member, an inner member, and a double-row rolling element. The outer member is provided with a double-row outer rolling surface integrally formed on an inner periphery. The inner member includes a hub ring provided with a small diameter step portion that extends axially on an outer periphery, and at least one inner ring that is press-fitted into the small diameter step portion of the hub ring, and is provided with a double-row inner rolling surface facing the double-row outer rolling surface on an outer periphery. The double-row rolling element is rollably accommodated between the rolling surface of the outer member and the rolling surface of the inner member. A sealing member seals between the outer member and the inner member in the bearing device for vehicle wheel. The sealing member includes a sealing plate and a slinger. The sealing plate includes a sealing plate fitting portion fitted to an inner peripheral surface of the outer member, a support portion having an annular shape and extending from the sealing plate fitting portion to a radially inner side, and a plurality of sealing lips provided on one side surface of the support portion. The slinger includes a slinger fitting portion fitted to an outer peripheral surface of the inner member, and a standing plate portion having an annular shape, extending from the slinger fitting portion to a radially outer side, and facing the support portion. At least one of the plurality of sealing lips contacts any one of one side surface of the standing plate portion or an outer peripheral surface of the slinger fitting portion. A groove portion having an annular shape is formed in such a manner that a part of the support portion on a farther radially outer side than a position where the sealing lip on a radially outermost side is provided is bent. A wall portion having a cylindrical shape is formed in such a manner that an outer peripheral portion of the standing plate portion is bent. The wall portion is disposed in non-contact with the groove portion on an entire periphery of the groove portion to configure a labyrinth. In other words, the outer peripheral portion of the standing plate portion is bent, and thereby the wall portion having a cylindrical shape is formed. Then, the wall portion is inserted into the groove portion in non-contact with the groove portion to configure the labyrinth.

In the sealing member, a part of the wall portion is configured to overlap the support portion as viewed in the radial direction.

In the sealing member, the support portion is provided with a labyrinth lip along an inner peripheral surface of the wall portion in non-contact with the wall portion, and a gap between the wall portion and the labyrinth lip is configured as a labyrinth.

In the sealing member, the support portion is provided with a gutter portion that covers an opening portion on an inner side of a seal of the labyrinth in non-contact with the wall portion.

In the sealing member, the support portion is provided with a labyrinth lip along one side surface of the standing plate portion in non-contact with the standing plate portion, and a gap between the standing plate portion and the labyrinth lip is configured as a labyrinth.

The sealing plate fitting portion has a length within a range of 1.2 to 2.5 times a distance between the support portion and the standing plate portion.

The bearing device for vehicle wheel includes the sealing member according to any one of the above.

Advantageous Effects of Invention

As effects of the present invention, the following effects are obtained.

That is, in the present invention, the wall portion, having a cylindrical shape, of the slinger is inserted into the groove portion, having an annular shape, of the sealing plate. As a result, the labyrinth is configured on both sides of an outer peripheral surface and an inner peripheral surface of the wall portion. This enhances the sealing performance without increasing the rotational torque.

In the present invention, since only the groove portion of the sealing plate protrudes from the support portion and the wall portion is inserted, the labyrinth is configured without a change in the configuration of the sealing lip. This enhances the sealing performance without increasing the rotational torque.

In the present invention, the labyrinth is further configured by the wall portion of the slinger and the labyrinth lip, and thus a labyrinth length is increased. This enhances the sealing performance without increasing the rotational torque.

In the present invention, the gutter portion in non-contact state is formed to receive the muddy water, dust, and the like entering inside. This enhances the sealing performance without increasing the rotational torque.

In the present invention, in addition to the labyrinth configured on both sides of the outer peripheral surface and the inner peripheral surface of the wall portion, the labyrinth is further configured by the standing plate portion of the slinger and the labyrinth lip, thereby increasing the labyrinth length. This further enhances the sealing performance without increasing the rotational torque.

BRIEF DESCRIPTION OF DRAWINGS

FIG. 1 is a perspective view showing an overall configuration of a bearing device for vehicle wheel according to one embodiment.

FIG. 2 is a cross-sectional view showing the overall configuration of the bearing device for vehicle wheel according to one embodiment.

FIG. 3 is an enlarged cross-sectional view showing a configuration of a sealing member according to a first embodiment of the sealing member.

FIG. 4 is an enlarged cross-sectional view showing a configuration of a sealing member according to a second embodiment of the sealing member.

FIG. 5 is an enlarged cross-sectional view showing a configuration of a sealing member according to a third embodiment of the sealing member.

FIG. 6 is an enlarged cross-sectional view showing a configuration of a sealing member according to a fourth embodiment of the sealing member.

FIG. 7 is an enlarged cross-sectional view showing a configuration of a sealing member according to a fifth embodiment of the sealing member.

FIG. 8 is an enlarged cross-sectional view showing a configuration of the sealing member in which an encoder is provided according to the first embodiment of the sealing member.

FIG. 9 is a cross-sectional view showing an overall configuration of a bearing device for vehicle wheel according to a second embodiment.

DESCRIPTION OF EMBODIMENTS

Hereinafter, a bearing device 1 for vehicle wheel that is a first embodiment of a bearing device for vehicle wheel according to the present invention will be described with reference to FIGS. 1 to 3.

As shown in FIGS. 1 and 2, the bearing device 1 for vehicle wheel rotatably supports a wheel in a suspension device of a vehicle, such as an automobile. The bearing device 1 for vehicle wheel includes an outer ring 2 that is an outer member, a hub ring 3 that is an inner member, an inner ring 4, two rows of an inner side ball row 5a and an outer side ball row 5b that are rolling rows, an inner side sealing member 6 that is a sealing member, and an outer side sealing member 9 that is a sealing member. The inner side sealing member 6 and the outer side sealing member 9 are bearing seals for vehicle wheel. As disclosed herein, the inner side represents a side close to a vehicle body of the bearing device 1 for vehicle wheel when the bearing device 1 for vehicle wheel is attached to the vehicle body, and the outer side represents a side close to a wheel of the bearing device 1 for vehicle wheel when the bearing device 1 for vehicle wheel is attached to the vehicle body. An axial direction represents a direction along a rotation axis of the bearing device 1 for vehicle wheel.

As shown in FIG. 2, the outer ring 2 that is the outer member supports the hub ring 3 and the inner ring 4. The outer ring 2 is formed in a substantially cylindrical shape. An inner side opening portion 2a into which the inner side sealing member 6 can be fitted is formed at an inner side end of the outer ring 2. An outer side opening portion 2b into which the outer side sealing member 9 can be fitted is formed at an outer side end of the outer ring 2.

An inner side outer rolling surface 2c and an outer side outer rolling surface 2d that have annular shapes are formed on an inner peripheral surface of the outer ring 2 in parallel to each other in a circumferential direction. The outer side outer rolling surface 2d is formed to have a pitch circle diameter equal to or larger than a pitch circle diameter of the inner side outer rolling surface 2c. A vehicle body mounting flange 2e for being mounted onto a knuckle of a suspension device (not shown) is integrally formed on an outer peripheral surface of the outer ring 2.

The hub ring 3 configuring the inner member rotatably supports a vehicle wheel (not shown). The hub ring 3 is formed in a bottomed cylindrical shape. A small diameter step portion 3a having a reduced diameter is formed on an outer peripheral surface at an inner side end of the hub ring 3. A wheel mounting flange 3b for mounting a wheel is integrally formed at an outer side end of the hub ring 3. The wheel mounting flange 3b is provided with hub bolts 3d at circumferential positions at equal intervals. Further, the hub ring 3 is disposed such that an outer side inner rolling surface 3c faces an outer side outer rolling surface 2d of the outer ring 2. Serrations (or splines) for torque transmission are formed on an inner circumference of the hub ring 3. The hub ring 3 is provided with the inner ring 4 on the small diameter step portion 3a.

The inner ring 4 applies preload to the inner side ball row 5a that is a rolling row and is disposed closer to the vehicle body when mounted on the vehicle, and to the outer side ball row 5b that is a rolling row and is disposed closer to the wheel when mounted on the vehicle. The inner ring 4 is formed in a cylindrical shape. An inner rolling surface 4a having an annular shape is formed in a circumferential direction on an outer peripheral surface of the inner ring 4. The inner ring 4 is fixed to the inner side end of the hub ring 3 by press-fitting. That is, the inner rolling surface 4a is configured by the inner ring 4 on the inner side of the hub ring 3. The hub ring 3 is disposed such that the inner rolling surface 4a of the inner ring 4 at the inner side end faces the inner side outer rolling surface 2c of the outer ring 2.

The inner side ball row 5a and the outer side ball row 5b, which are rolling rows, rotatably support the hub ring 3. In the inner side ball row 5a and the outer side ball row 5b, a plurality of balls as rolling elements is held by a cage annularly. The inner side ball row 5a is rollably sandwiched between the inner rolling surface 4a of the inner ring 4 and the inner side outer rolling surface 2c of the outer ring 2. The outer side ball row 5b is rollably sandwiched between the inner rolling surface 3c of the hub ring 3 and the outer side outer rolling surface 2d of the outer ring 2. That is, the inner side ball row 5a and the outer side ball row 5b support the hub ring 3 and the inner ring 4 rotatably with respect to the outer ring 2. In the bearing device 1 for vehicle wheel, a double-row angular ball bearing includes the outer ring 2, the hub ring 3, the inner ring 4, the inner side ball row 5a, and the outer side ball row 5b.

As shown in FIGS. 2 and 3, the inner side sealing member 6 that is the first embodiment of the sealing member according to the present invention closes a gap between the inner side opening portion 2a of the outer ring 2 and the inner ring 4. The inner side sealing member 6 includes a two-side lip type pack seal that brings two sealing lips into contact with each other. The inner side sealing member 6 includes a sealing plate 7 having a substantially cylindrical shape and a slinger 8 having a substantially cylindrical shape. In the following embodiments, the inner side sealing member needs to be a pack seal including one or a plurality of sealing lips.

As shown in FIG. 3, the sealing plate 7 includes a core metal and a sealing lip (see the gray part). The core metal includes, for example, a ferritic stainless steel plate (e.g. JIS standard SUS430 series), an austenitic stainless steel plate (e.g. JIS standard SUS304 series), or a cold rolled steel plate subjected to a rust preventive treatment (e.g. JIS standard SPCC series). An outer edge of a steel plate having an annular shape is bent by press working, and thereby the core metal is formed in a substantially L shape in an axial sectional view. As a result, the core metal includes a sealing plate fitting portion 7a, a groove portion 7b having an annular shape and protruding to an axial outer side, and a support portion 7c having an annular shape and extending from a side surface of the groove portion 7b toward an axial center.

A sealing material is, for example, vulcanized and bonded to the core metal at an inner side end of the sealing plate fitting portion 7a. A resin made of the same material as the sealing material is, for example, vulcanized and bonded to the core metal continuously from the inner side end of the sealing plate fitting portion 7a on the side surface inside the groove portion 7b (hereinafter referred to as the groove portion 7b including the resin vulcanized and bonded). A radial lip 7d, a dust lip 7e, and an axial lip 7f are integrally, for example, vulcanized and bonded in that order from the radially inner side on one side (inner side) surface of the support portion 7c. The radial lip 7d, the dust lip 7e and the axial lip 7f include, for example, NBR (acrylonitrile-butadiene rubber), HNBR (hydrogenated acrylonitrile-butadiene rubber), which has excellent heat resistance, EPDM (ethylene propylene rubber), ACM (polyacrylic rubber), which has excellent heat resistance and chemical resistance, FKM (fluororubber), or synthetic rubber such as silicon rubber. The sealing plate 7 is configured integrally with the outer ring 2 with the sealing plate fitting portion 7a fitted into the inner side opening portion 2a of the outer ring 2.

The slinger 8 includes, for example, a steel plate equivalent to the sealing plate 7. An outer edge and an inner edge of the steel plate having an annular shape are bent by press working, whereby the slinger 8 is formed substantially in a U shape in an axial sectional view. Thus, the slinger 8 includes a slinger fitting portion 8a, a standing plate portion 8b having an annular shape and extending toward a radially outer side from the inner side end of the slinger fitting portion 8a, and a wall portion 8c having a cylindrical shape and extending toward the axially outer side from an outer peripheral portion of the standing plate portion 8b. In the slinger 8, the slinger fitting portion 8a is fitted into and fixed to the inner ring 4 closer to the inner side than the sealing plate 7. The standing plate portion 8b is disposed to face the support portion 7c of the sealing plate 7 in the axial direction. Further, the wall portion 8c is inserted into the groove portion 7b of the sealing plate 7 in non-contact state.

Thus, the inner side sealing member 6 is disposed such that the sealing plate 7 fitted into the inner side opening portion 2a of the outer ring 2 and the slinger 8 fitted into the inner ring 4 face each other to configure the pack seal. The radial lip 7d of the sealing plate 7 is in contact with an outer peripheral surface of the slinger fitting portion 8a of the slinger 8 via an oil film, and mainly prevents leakage of grease inside of the bearing device 1 for vehicle wheel to outside. The dust lip 7e of the sealing plate 7 is in contact with one side surface (outer side) of the standing plate portion 8b of the slinger 8 via an oil film, and mainly prevents dust and the like from entering inside of the bearing device 1 for vehicle wheel from outside. Further, the axial lip 7f of the sealing plate 7 is in contact with the one side surface of the standing plate portion 8b via the oil film on a farther radially outer side than a position which the dust lip 7e is in contact with. Thus, muddy water or the like is prevented from entering inside mainly from outside of the bearing device 1 for vehicle wheel. The groove portion 7b and the wall portion 8c configure a labyrinth La (shaded). The radial lip 7d, the dust lip 7e, and the axial lip 7f of the sealing plate 7 are in contact with the slinger 8 via the oil film, whereby the inner side sealing member 6 is configured to be slidable with respect to the slinger 8. As a result, the inner side sealing member 6 prevents leakage of the lubricating grease from the inner side opening portion 2a of the outer ring 2 and entry of rainwater, dust, and the like from outside.

As shown in FIG. 2, the outer side sealing member 9 closes a gap between the outer side opening portion 2b of the outer ring 2 and the hub ring 3. The outer side sealing member 9 is configured as an integral seal in which a sealing lip is, for example, vulcanized and bonded to a core metal having a substantially cylindrical shape.

The core metal of the outer side sealing member 9 is made of for example, a ferritic stainless steel plate (e.g. JIS standard SUS430 series), an austenitic stainless steel plate (e.g. JIS standard SUS304 series), or a cold rolled steel plate subjected to a rust preventive treatment (e.g. JIS standard SPCC series). An outer edge of a steel plate having an annular shape is bent by press working, and thereby the core metal is formed in a substantially L shape in an axial sectional view. The sealing lip is made of, for example, NBR (acrylonitrile-butadiene rubber), HNBR (hydrogenated acrylonitrile-butadiene rubber), which has excellent heat resistance, EPDM (ethylene propylene rubber), ACM (polyacrylic rubber), which has excellent heat resistance and chemical resistance, FKM (fluororubber), or synthetic rubber such as silicon rubber.

The outer side sealing member 9 has a core metal fitted into the outer side opening portion 2b of the outer ring 2. At this time, the outer side sealing member 9 is disposed such that the sealing lip is in contact with a seal sliding surface of the hub ring 3. The sealing lip is in contact with the seal sliding surface of the hub ring 3 via the oil film, and thereby the outer side sealing member 9 is configured to be slidable with respect to the seal sliding surface. Thus, the sealing lip of the outer side sealing member 9 prevents leakage of the lubricating grease from the outer side opening portion 2b of the outer ring 2 and entry of rainwater, dust, and the like from outside.

In the bearing device 1 for vehicle wheel configured as described above, the hub ring 3 and the inner ring 4 are rotatably supported by the outer ring 2 via the inner side ball row 5a and the outer side ball row 5b. Further, in the bearing device 1 for vehicle wheel, the gap between the inner side opening portion 2a of the outer ring 2 and the inner ring 4 is closed by the inner side sealing member 6, and the gap between the outer side opening portion 2b of the outer ring 2 and the hub ring 3 is closed by the outer side sealing member 9. As a result, in the bearing device 1 for vehicle wheel, the hub ring 3 and the inner ring 4 supported by the outer ring 2 rotate while leakage of the lubricating grease from inside and entry of rainwater, dust, and the like from outside are prevented.

Next, the groove portion 7b of the sealing plate 7 and the wall portion 8c of the slinger 8 configuring the inner side sealing member 6 will be described in detail with reference to FIG. 3.

As shown in FIG. 3, the groove portion 7b of the sealing plate 7 is formed such that the core metal is bent to connect the sealing plate fitting portion 7a and the support portion 7c. The groove portion 7b includes a bottom side surface having an annular shape and extending by a width W from the outer side end of the sealing plate fitting portion 7a having a length L1 toward the radially inner side, and an inner side surface having a cylindrical shape and extending by a length L2 toward an axially inner side from a radially inner side end of the bottom side surface. The support portion 7c extends toward the radially inner side from the inner side end of the inner side surface, such that one side surface (surface on which the sealing lip is formed) of the support portion 7c coincides with a position of the length L2 from the bottom side surface that is the outer side end of the inner side surface. That is, in the sealing plate 7, the groove portion 7b having an annular shape and a groove depth of L2 is formed on the farther radially outer side than a part where the radial lip 7d, the dust lip 7e, and the axial lip 7f of the support portion 7c are provided. Further, in the sealing plate 7, the groove portion 7b having a width W protrudes from the one side surface of the support portion 7c by the length L2 toward the axially outer side. In other words, in the sealing plate 7, a range of the width W toward the radially inner side from an outer peripheral surface of the sealing plate fitting portion 7a protrudes by the length L2 toward the axially outer side from the one side surface of the support portion 7c.

The wall portion 8c of the slinger 8 extends from the outer peripheral portion of the standing plate portion 8b to the axially outer side. The wall portion 8c overlaps substantially the center of the groove portion 7b of the sealing plate 7 as viewed in the axial direction. That is, the wall portion 8c is formed in a cylindrical shape having such a diameter that the wall portion 8c is disposed in non-contact with the entire periphery of the groove portion 7b. Further, a part of the wall portion 8c overlaps the support portion 7c as viewed in the radial direction. That is, when the inner side end of the sealing plate fitting portion 7a and the inner side surface of the standing plate portion 8b are on the same plane, the wall portion 8c has such a length that is longer than a length L3 and that the wall portion 8c does not contact the bottom side surface of the groove portion 7b. The length L3 is obtained by subtracting the length L2 of the inner side surface from the length L1 of the sealing plate fitting portion 7a.

In the inner side sealing member 6, the sealing plate 7 is fitted into the inner side opening portion 2a of the outer ring 2, and at the same time, the slinger 8 is fitted into the inner ring 4. In this state, the wall portion 8c of the slinger 8 is disposed in non-contact with the entire periphery of the groove portion 7b of the sealing plate 7. That is, the wall portion 8c is disposed such that a slight gap is created between the sealing plate fitting portion 7a and the wall portion 8c, between the bottom side surface of the groove portion 7b and the wall portion 8c, and between the inner side surface of the groove portion 7b and the wall portion 8c. Therefore, the inner side sealing member 6 has a labyrinth La (shaded) in the gap between the sealing plate fitting portion 7a and the wall portion 8c, between the bottom side surface of the groove portion and the end surface of the wall portion 8c, and between the inner side surface of the groove portion 7b and the wall portion 8c. At this time, the labyrinth length in the inner side sealing member 6 is a sum of the outer peripheral surface of the wall portion 8c that is longer than the length L3, a plate thickness of the wall portion 8c, and a part of the inner peripheral surface of the wall portion 8c that faces the groove portion 7b (inner side surface).

With this configuration, the inner side sealing member 6 configures the labyrinth La with the outer peripheral surface and the inner peripheral surface of the wall portion 8c of the slinger 8. Thus, the inner side sealing member 6 is sealed by the labyrinth La having the labyrinth length longer than a distance between the support portion 7c and the standing plate portion 8b of the slinger 8 (the length L3 obtained by subtracting the length L2 of the inner side surface from the length L1 of the sealing plate fitting portion 7a). The length L1 of the sealing plate fitting portion 7a is preferably set within a range of 1.2 to 2.5 times the length L3, such that the labyrinth La can exhibit effective sealing performance without increasing an axial length of the bearing device 1 for vehicle wheel. Further, in the inner side sealing member 6, only the groove portion 7b protrudes from the one side surface of the support portion 7c by the length L2 on the axially outer side. Thus, the labyrinth La is configured while the standing plate portion 8b is in contact with each sealing lip. This enhances the sealing performance of the inner side sealing member 6 without increasing the rotational torque.

Further, the inner side sealing member 6 protrudes only in the range of the width W from the outer peripheral surface of the sealing plate fitting portion 7a to the radially inner side. Thus, the groove portion 7b does not interfere with the inner side ball row 5a of the bearing device 1 for vehicle wheel. This configuration of the inner side sealing member 6 eliminates the need for increasing the axial length of the bearing device 1 for vehicle wheel. That is, the inner side sealing member 6 achieves the configuration of the bearing device 1 for vehicle wheel with improved sealing performance, without changing the structure of the bearing device 1 for vehicle wheel, and without increasing the rotational torque. Further, since the groove portion 7b is formed by the core metal made of metal the inner side sealing member 6 is not greatly scraped like a resin even with solid matter, such as sand, entering between the groove portion 7b and the wall portion 8c. Therefore, the inner side sealing member 6 can maintain a labyrinth effect even in a severe environment.

Next, an inner side sealing member 10 that is a second embodiment of the sealing member according to the present invention will be described with reference to FIG. 4. In the inner side sealing member 6 shown in FIGS. 1 to 3, the inner side sealing member 10 according to the following embodiment is applied in place of the inner side sealing member 6. The names, figure numerals, and reference signs used in the description are used to indicate the same components. In the following embodiments, the same points as those of the embodiments already described will be omitted, and the differences will be mainly described.

As shown in FIG. 4, the bearing device 1 for vehicle wheel includes the inner side sealing member 10 that is a sealing member.

A radial lip 7d, a dust lip 7e, an axial lip 7f and a labyrinth lip 7g are integrally, for example, vulcanized and bonded in that order from the radially inner side on one side (inner side) surface of the support portion 7c of the sealing plate 7. The labyrinth lip 7g includes the same resin as the other sealing lips.

The labyrinth lip 7g is formed in a cylindrical shape. The labyrinth lip 7g extends from an inner side end of the inner side surface of the groove portion 7b toward the axially inner side. The labyrinth lip 7g is formed along the inner peripheral surface of the wall portion 8c in non-contact with the entire periphery of the wall portion 8c of the sealing plate 7. That is, the labyrinth lip 7g extends on the inner side surface of the groove portion 7b toward the axially inner side. The labyrinth lip 7g has such a length that the labyrinth lip 7g does not contact the standing plate portion 8b of the slinger 8.

In the inner side sealing member 10, the sealing plate 7 is fitted into the inner side opening portion 2a of the outer ring 2, and at the same time, the slinger 8 is fitted into the inner ring 4. In this state, the wall portion 8c of the slinger 8 is disposed between the sealing plate fitting portion 7a and the labyrinth lip 7g, and at the groove portion 7b of the sealing plate 7, in non-contact with the entire periphery. In other words, the wall portion 8c of the slinger 8 is inserted between the sealing plate fitting portion 7a and the labyrinth lip 7g and in the groove portion 7b of the sealing plate 7 in non-contact state. That is, the wall portion 8c is disposed such that a slight gap is created between the sealing plate fitting portion 7a and the wall portion 8c, between the outer side surface of the groove portion 7b and the wall portion 8c, between the bottom side surface of the groove portion 7b and the wall portion 8c, between the inner side surface of the groove portion 7b and the wall portion 8c, and between the labyrinth lip 7g and the wall portion 8c. As a result, the inner side sealing member 10 has a labyrinth La (shaded) in the gap between the sealing plate fitting portion 7a and the wall portion 8c, in the gap between the groove portion 7b and the wall portion 8c, and between the labyrinth lip 7g and the wall portion 8c. At this time, the labyrinth length in the inner side sealing member 6 is a sum of the outer peripheral surface of the wall portion 8c that is longer than the length L3, a plate thickness of the wall portion 8c, and a part of the inner peripheral surface of the wall portion 8c that faces the groove portion 7b (inner side surface) and the labyrinth lip 7g.

With this configuration, the inner side sealing member 10 configures the labyrinth La with most part of the outer peripheral surface and the inner peripheral surface of the wall portion 8c of the slinger 8. Thus, the inner side sealing member 10 is sealed by the labyrinth La having the labyrinth length longer than a distance between the support portion 7c and the standing plate portion 8b of the slinger 8 (length L3). This enhances the sealing performance of the inner side sealing member 10 without increasing the rotational torque.

Next, an inner side sealing member 11 that is a third embodiment of the sealing member according to the present invention will be described with reference to FIG. 5.

As shown in FIG. 5, the bearing device 1 for vehicle wheel includes the inner side sealing member 11 that is a sealing member.

The radial lip 7d, the dust lip 7e, the axial lip 7f and a gutter portion 7h are, for example, vulcanized and bonded in that order from the radially inner side on one side (inner side) surface of the support portion 7c of the sealing plate 7. The gutter portion 7h includes the same resin as the radial lip 7d and the like.

The gutter portion 7h is formed in a cylindrical shape having an outer diameter increasing toward the inner side. The gutter portion 7h extends from an arbitrary position between the axial lip 7f and an outer peripheral portion of the support portion 7c of the sealing plate 7 toward the axially inner side. At this time, the gutter portion 7h has such a length that the gutter portion 7h does not contact the wall portion 8c. As a result, in the inner side sealing member 11, an annular flow path is configured from the gutter portion 7h and the support portion 7c to the inner side end of the inner side surface of the groove portion 7b.

In the inner side sealing member 11, the sealing plate 7 is fitted into the inner side opening portion 2a of the outer ring 2, and at the same time, the slinger 8 is fitted into the inner ring 4. In this state, the gutter portion 7h is configured to cover an opening portion of the labyrinth La (shaded) on the side of the axial lip 7f. That is, the inner side sealing member 11 is provided with the gutter portion 7h on the opening portion of the labyrinth La configured by the gap between the inner side surface of the groove portion 7b and the inner peripheral surface of the wall portion 8c, whereby the inner side sealing member 11 has functions to block and discharge muddy water, dust, and the like.

With this configuration, the inner side sealing member 11 blocks muddy water, dust, and the like by the gutter portion 7h between the labyrinth La and the axial lip 7f and discharges the muddy water, dust, and the like in a direction away from the sealing lip. Thus, the axial lip 7f is not damaged by the muddy water, dust, and the like.

This enhances the sealing performance of the inner side sealing member 11 without increasing the rotational torque.

Next, an inner side sealing member 12 that is a fourth embodiment of the sealing member according to the present invention will be described with reference to FIG. 6.

As shown in FIG. 6, the bearing device 1 for vehicle wheel includes the inner side sealing member 12 that is the sealing member.

The radial lip 7d, the dust lip 7e, and a labyrinth lip 7i are, for example, vulcanized and bonded in that order from the radially inner side on one side (inner side) surface of the support portion 7c of the sealing plate. The labyrinth lip 7i includes the same resin as the radial lip 7d.

The labyrinth lip 7i is formed in a cylindrical shape having an outer diameter increasing toward the inner side. The labyrinth lip 7i extends from an arbitrary position between the dust lip 7e and an outer peripheral portion of the support portion 7c of the sealing plate 7 toward the axially inner side. That is, the labyrinth lip 7i is configured to cover the dust lip 7e. At this time, the labyrinth lip 7i has such a length that the labyrinth lip 7i does not contact the standing plate portion 8b of the slinger 8.

In the inner side sealing member 12, the sealing plate 7 is fitted into the inner side opening portion 2a of the outer ring 2, and at the same time, the slinger 8 is fitted into the inner ring 4. In this state, a tip of the labyrinth lip 7i and one side surface (outer side) of the standing plate portions 8b are disposed in non-contact with each other. That is, the labyrinth lip 7i is disposed such that a slight gap is created between the standing plate portion 8b and the labyrinth lip 7i. Thus, in addition to the gap between the sealing plate fitting portion 7a and the wall portion 8c and the gap between the groove portion 7b and the wall portion 8c, the inner side sealing member 12 further has a labyrinth La (shaded) between the tip of the labyrinth lip 7i and the one side surface of the standing plate portion 8b.

With this configuration, the inner side sealing member 12 is sealed by the labyrinth La in a non-contact state configured between the tip of the labyrinth lip 7i and the one side surface of the standing plate portion 8b instead of the axial lip that contacts and seals the standing plate portion 8b. This enhances the sealing performance of the inner side sealing member 12 without increasing the rotational torque. Note that the inner side sealing member 12 according to this embodiment may be provided further with the labyrinth lip 7g in the second embodiment and the gutter portion 7h in the third embodiment described above. This further enhances the sealing performance of the inner side sealing member 12 without increasing the rotational torque.

Next, an inner side sealing member 13 that is a fifth embodiment of the sealing member according to the present invention will be described with reference to FIG. 7.

As shown in FIG. 7, the bearing device 1 for vehicle wheel includes the inner side sealing member 13 that is a sealing member.

The sealing plate 7 includes a core metal and a sealing lip. The core metal includes a sealing plate fitting portion 7a, a groove portion 7j having an annular shape and formed on the axially inner side, and a support portion 7c having an annular shape and extending from a side surface of the groove portion 7j toward an axial center.

With the core metal bent, the groove portion 7j of the sealing plate 7 is formed between the sealing plate fitting portion 7a and the support portion 7c. The groove portion 7j includes a bottom side surface having an annular shape and extending by a width W to the radially inner side from the outer side end of the sealing plate fitting portion 7a having a length L4, and an inner side surface having a cylindrical shape and extending by a length L5 from an end surface of the bottom side surface to the axially inner side. The support portion 7c extends toward the radially inner side from a position where the inner side surface having a cylindrical shape is further folded back toward the axially outer side by the length L5. That is, the groove portion 7j is formed in such a manner that the core metal between the sealing plate fitting portion 7a and the axial lip 7f is folded back to protrude toward the axially inner side. As a result, the groove portion 7j is configured between the sealing plate fitting portion 7a and the support portion 7c without protruding toward the axially outer side.

A part of the wall portion 8c of the slinger 8 overlaps the inner side surface of the groove portion 7j formed of the core metal of the sealing plate 7 as viewed in the radial direction. That is, when the inner side end of the sealing plate fitting portion 7a and the inner side surface of the standing plate portion 8b are on the same plane, the wall portion 8c has such a length that is longer than a length obtained by subtracting the length L5 of the inner side surface from the length IA of the sealing plate fitting portion 7a, and that the wall portion 8c does not contact the groove portion 7j.

In the inner side sealing member 13, the sealing plate 7 is fitted into the inner side opening portion 2a of the outer ring 2, and at the same time, the slinger 8 is fitted into the inner ring 4. In this state, the wall portion 8c of the slinger 8 is inserted into the groove portion 7j of the sealing plate 7 in non-contact with each other. That is, the wall portion 8c is disposed such that a slight gap is created between the sealing plate fitting portion 7a and the wall portion 8c, between the bottom side surface of the groove portion 7j and the wall portion 8c, and between the inner side surface of the groove portion 7j and the wall portion 8c. Therefore, the inner side sealing member 13 has a labyrinth La (shaded) in the gap between the sealing plate fitting portion 7a and the wall portion 8c, between the bottom side surface of the groove portion 7j and the wall portion 8c, and between the inner side surface of the groove portion 7j and the wall portion 8c. At this time, the labyrinth length in the inner side sealing member 13 is a sum of the outer peripheral surface of the wall portion 8c, the plate thickness of the wall portion 8c, and the length L5 (inner side surface) of the groove portion 7j.

With this configuration, the inner side sealing member 13 configures the labyrinth La with the outer peripheral surface and the inner peripheral surface of the wall portion 8c of the slinger 8. Thus, the inner side sealing member 13 is sealed by the labyrinth La having the labyrinth length longer than a distance between the support portion 7c of the inner side sealing member 13 and the standing plate portion 8b of the slinger 8. Further, since the inner side sealing member 13 is formed in such a manner that the groove portion 7j does not protrude toward the axially outer side, the labyrinth La is configured without a change in the configuration of the bearing device 1 for vehicle wheel. This enhances the sealing performance of the inner side sealing member 13 without increasing the rotational torque. Furthermore, this configuration of the inner side sealing member 13 eliminates the need for increasing the axial length of the bearing device 1 for vehicle wheel. That is, the inner side sealing member 13 achieves the configuration of the bearing device 1 for vehicle wheel with improved sealing performance, without changing the structure of the bearing device 1 for vehicle wheel, and without increasing the rotational torque.

As shown in FIG. 8, each inner side sealing member of the first to fifth embodiments may be a pack seal with an encoder, which is provided with an encoder.

An inner side sealing member 14 is further provided with a magnetic encoder 15 on the inner side sealing member 6 in the first embodiment. The magnetic encoder 15 is used to detect rotational speeds of the hub ring 3 and the inner ring 4 with respect to the outer ring 2. The magnetic encoder 15 configures a rotational speed detection device in combination with a magnetic sensor (not shown). The magnetic encoder 15 is integrally provided on another side surface (inner side) of the slinger 8 in a range from the slinger fitting portion 8a to the wall portion 8c, for example, by vulcanization bonding. That is, the magnetic encoder 15 is disposed in the inner side opening portion 2a of the outer ring 2. The bearing device 1 for vehicle wheel detects, by a magnetic sensor (not shown) fixed outside, a change in magnetism of the magnetic encoder 15 that rotates integrally with the inner ring 4.

Further, as shown in FIG. 9, the bearing device 1 for vehicle wheel that is the first embodiment of the bearing device for vehicle wheel is configured by a double-row angular ball bearing. However, the bearing device 1 for vehicle wheel may be configured by a bearing device for vehicle wheel that is, for example, a double-row tapered roller bearing.

A bearing device 16 for vehicle wheel that is a second embodiment of the bearing device for vehicle wheel includes an outer ring 17 that is an outer member, a hub ring 18 that is an inner member, an inner ring 19, two rows of an inner side tapered roller row 20a and an outer side tapered roller row 20b that are rolling rows, the inner side sealing member 6 that is the first embodiment of the sealing member, and the outer side sealing member 9 that is the sealing member.

The outer ring 17 that is an outer member supports the hub ring 18 and the inner ring 19. The outer ring 17 is formed in a substantially cylindrical shape. The outer ring 17 is provided with an inner side opening portion 17a and an outer side opening portion 17b. An inner side outer rolling surface 17c and an outer side outer rolling surface 17d formed in annular shapes are provided on an inner peripheral surface of the outer ring 17 in parallel to each other in a circumferential direction. The inner side outer rolling surface 17c and the outer side outer rolling surface 17d are each formed in a tapered shape having an inner diameter that increases toward an end on which each rolling surface is formed.

The hub ring 18 configuring the inner member rotatably supports a vehicle wheel (not shown). A small diameter step portion 18a having a reduced diameter is formed on the outer peripheral surface at an inner side end of the hub ring 18. A wheel mounting flange 18b is integrally formed at an outer side end of the hub ring 18. The hub ring 18 is disposed such that the outer side inner rolling surface 18c faces the outer side outer rolling surface 17d of the outer ring 17. The outer side inner rolling surface 18c is formed in a tapered shape having an outer diameter increasing toward the outer side. A large flange portion for guiding a tapered roller is formed on a large diameter side of the inner rolling surface 18c, and a small flange portion for preventing the tapered roller from falling off is formed on a small diameter side of the inner rolling surface 18c. The hub ring 18 is provided with the inner ring 19 on the small diameter step portion 18a.

The inner ring 19 applies preload to the inner side tapered roller row 20a and the outer side tapered roller row 20b. The inner ring 19 is fixed to the inner side end of the hub ring 18. An inner rolling surface 19a having an annular shape is formed in a circumferential direction on an outer peripheral surface of the inner ring 19. The inner rolling surface 19a is formed in a tapered shape having an outer diameter increasing toward the inner side. A large flange portion for guiding the tapered roller is formed on a large diameter side of the inner rolling surface 19a, and a small flange portion for preventing the tapered roller from falling off is formed on a small diameter side of the inner rolling surface 19a. The hub ring 18 is disposed such that the inner rolling surface 19a faces the inner side outer rolling surface 17c of the outer ring 17.

The inner side tapered roller row 20a and the outer side tapered roller row 20b, which are rolling rows, rotatably support the hub ring 18. In the inner side tapered roller row 20a and the outer side tapered roller row 20b, a plurality of tapered rollers as rolling elements is held by a cage annularly. The inner side tapered roller row 20a is rollably sandwiched between the inner rolling surface 19a of the inner ring 19 and the inner side outer rolling surface 17c of the outer ring 17. The outer side tapered roller row 20b is rollably sandwiched between the inner rolling surface 18c of the hub ring 18 and the outer side outer rolling surface 17d of the outer ring 17. In the bearing device 16 for vehicle wheel, a double-row tapered roller bearing includes the outer ring 17, the hub ring 18, the inner ring 19, the inner side tapered roller row 20a, and the outer side tapered roller row 20b.

The inner side sealing member 6 protrudes only in the range of the width W from an outer peripheral surface of the sealing plate fitting portion 7a to the radially inner side (see FIG. 3). Thus, the groove portion 7b does not interfere with the cage of the inner side tapered roller row 20a of the bearing device 16 for vehicle wheel. Therefore, this configuration of the inner side sealing member 6 eliminates the need for increasing an axial length of the bearing device 16 for vehicle wheel. That is, the inner side sealing member 6 achieves the configuration of the bearing device 16 for vehicle wheel with improved sealing performance, without changing the stricture of the bearing device 16 for vehicle wheel, and without increasing the rotational torque.

The embodiments of the present invention have been described above. However, the present invention is not limited to such embodiments, which are merely examples, and various further modifications can be made without departing from the gist of the present invention. The scope of the present invention is indicated by the description of the scope of claims, and further includes the equivalent meanings described in the scope of claims and all modifications within the scope of claims. Further, in the embodiments, the bearing device 1 for vehicle wheel is configured as the bearing devices 1 and 16 for vehicle wheel having a third generation structure in which inner rolling surfaces 3c and 18c are directly formed on the outer periphery of the hub ring 3. However, the bearing device 1 for vehicle wheel is not limited to this configuration, and may have a second generation structure or a first generation structure in which a pair of inner rings 4 is press-fitted into and fixed to the hub ring 3. In the embodiments, the sealing member provided with the labyrinth La has been described as the inner side sealing members 6, 10, 11, 12, 13, and 14. However, the sealing member may be used as the outer side sealing member.

INDUSTRIAL APPLICABILITY

The present invention can be utilized for a sealing member and a bearing device for vehicle wheel including the sealing member.

REFERENCE SIGNS LIST 1, 16 Bearing device for vehicle wheel
2 Outer ring
2a Inner side opening portion
3 Hub ring
4 Inner ring
5a Inner side ball row
5b Outer side ball row
6, 10, 11, 12, 13, 14 Inner side sealing member
7 Sealing plate
7a Sealing plate fitting portion
7b Groove portion
7c Support portion
8 Slinger
8a Slinger fitting portion
8b Standing plate portion
8c Wall portion
La Labyrinth

The invention claimed is:

1. A sealing member that seals between an outer member and an inner member in a bearing device for vehicle wheel, the bearing device comprising:
the outer member provided with a double-row outer rolling surface integrally formed on an inner periphery;
the inner member including a hub ring provided with a small diameter step portion that extends axially on an outer periphery, and at least one inner ring that is press-fitted into the small diameter step portion of the hub ring, the inner member being provided with a double-row inner rolling surface that faces the double-row outer rolling surface on an outer periphery; and
a double-row rolling element that is rollably accommodated between the rolling surface of the outer member and the rolling surface of the inner member,
the sealing member comprising:
a sealing plate including a sealing plate fitting portion that is fitted to an inner peripheral surface of the outer member, a support portion having an annular shape and extending from the sealing plate fitting portion to a radially inner side, and a plurality of sealing lips provided on one side surface of the support portion; and
a slinger including a slinger fitting portion that is fitted to an outer peripheral surface of the inner member, and a standing plate portion having an annular shape, extending from the slinger fitting portion to a radially outer side, and facing the support portion,
wherein at least one of the plurality of sealing lips is in contact with any one of one side surface of the standing plate portion or an outer peripheral surface of the slinger fitting portion,
a groove portion having an annular shape is formed in such a manner that a part of the support portion on a farther radially outer side than a position where one of the sealing lips on a radially outermost side is provided is bent,
a wall portion having a cylindrical shape is formed in such a manner that an outer peripheral portion of the standing plate portion is bent, and
the wall portion is disposed in non-contact with the groove portion on an entire periphery of the groove portion to configure a labyrinth.

2. The sealing member according to claim 1, wherein the wall portion has a part that overlaps the support portion as viewed in a radial direction.

3. The sealing member according to claim 2, wherein the support portion is provided with a labyrinth lip along an inner peripheral surface of the wall portion in non-contact with the wall portion, and a gap between the wall portion and the labyrinth lip is configured as a labyrinth.

4. The sealing member according to claim 2, wherein the support portion is provided with a gutter portion that covers an opening portion on an inner side of a seal of the labyrinth in non-contact with the wall portion.

5. The sealing member according to claim 1, wherein the support portion is provided with a labyrinth lip along an inner peripheral surface of the wall portion in non-contact with the wall portion, and a gap between the wall portion and the labyrinth lip is configured as a labyrinth.

6. The sealing member according to claim 1, wherein the support portion is provided with a gutter portion that covers an opening portion on an inner side of a seal of the labyrinth in non-contact with the wall portion.

7. The sealing member according to claim 1, wherein the support portion is provided with a labyrinth lip along one side surface of the standing plate portion in non-contact with the standing plate portion, and a gap between the standing plate portion and the labyrinth lip is configured as a labyrinth.

8. The sealing member according to claim 1, wherein the sealing plate fitting portion has a length within a range of 1.2 to 2.5 times a distance between the support portion and the standing plate portion.

9. A bearing device for vehicle wheel, comprising the sealing member according to claim 1.

* * * * *